US012030207B2

(12) United States Patent
Muramoto et al.

(10) Patent No.: US 12,030,207 B2
(45) Date of Patent: Jul. 9, 2024

(54) WORKPIECE MACHINING APPARATUS

(71) Applicants: Sakura Seiki Co., Ltd., Yao (JP); UCHIDA YOKO CO., LTD, Tokyo (JP); UCHIDA YOKO GLOBAL CO., LTD., Tokyo (JP)

(72) Inventors: Ippei Muramoto, Yao (JP); Tomoki Takada, Yao (JP)

(73) Assignees: SAKURA SEIKI CO., LTD., Yao (JP); UCHIDA YOKO CO., LTD., Tokyo (JP); UCHIDA YOKO GLOBAL CO., LTD., Tokyo (JP)

( * ) Notice: Subject to any disclaimer, the term of this patent is extended or adjusted under 35 U.S.C. 154(b) by 0 days.

(21) Appl. No.: 17/772,066

(22) PCT Filed: Oct. 29, 2020

(86) PCT No.: PCT/JP2020/040710

§ 371 (c)(1),
(2) Date: Apr. 26, 2022

(87) PCT Pub. No.: WO2021/090763

PCT Pub. Date: May 14, 2021

(65) Prior Publication Data

US 2022/0297336 A1 Sep. 22, 2022

(30) Foreign Application Priority Data

Nov. 5, 2019 (JP) ................................ 2019-200460

(51) Int. Cl.
*B26F 1/42* (2006.01)

(52) U.S. Cl.
CPC ..................................... *B26F 1/42* (2013.01)

(58) Field of Classification Search
CPC .. B26F 1/42; B26F 1/0333; B26F 1/44; B26F 1/40; B26F 1/405; B26F 1/38; B26F 2001/4445; Y10T 83/793
See application file for complete search history.

(56) References Cited

U.S. PATENT DOCUMENTS 2,088,686 A 8/1937 Blanchard
3,024,688 A 3/1962 Rohm
(Continued)

FOREIGN PATENT DOCUMENTS

CN 104511944 A 4/2015
CN 208410037 U 1/2019
(Continued)

OTHER PUBLICATIONS

International Search Report for International Application No. PCT/JP2020/040710 dated Dec. 8, 2020 (2 sheets, 2 sheets translation, 4 sheets total).
(Continued)

*Primary Examiner* — Phong H Nguyen
(74) *Attorney, Agent, or Firm* — Kratz, Quintos & Hanson, LLP

(57) ABSTRACT

A pressure plate 12 has an upper surface 12*a* and a lower surface 12*b*. A blade die unit 16 for machining a workpiece by applying a pressure to a principal surface of the workpiece is arranged on the lower surface 12*b*. A face plate 24 has an upper surface 24*a* and a lower surface 24*b*, and is arranged such that the upper surface 24*a* faces the lower surface 12*b* with the blade die unit 16 interposed therebetween. An upper pressure roller 20 applies a pressure directed from the upper surface 12*a* side toward the lower surface 12*b* side of the pressure plate 12 to a portion of the upper surface 12*a*. A lower pressure roller 22 applies a pressure directed from the lower surface 24*b* side toward the upper surface 24*a* side of the face plate 24 to a portion of the
(Continued)

lower surface 24*b*. A motor changes a portion that the upper pressure roller 20 pressurizes, and also, a portion that the lower pressure roller 22 pressurizes is changed such that the portion that the lower pressure roller 22 pressurizes is aligned with the portion that the upper pressure roller 20 pressurizes when viewed from a direction crossing the lower surface 24*b*.

15 Claims, 7 Drawing Sheets

(56) References Cited

U.S. PATENT DOCUMENTS

| | | | | |
|---|---|---|---|---|
| 5,647,260 A * | 7/1997 | Nabity | F16P 3/125 83/DIG. 1 |
| 6,161,458 A * | 12/2000 | Spatafora | B26D 7/2628 83/507 |
| 6,220,136 B1 * | 4/2001 | Benes | B26F 1/42 83/568 |
| 2002/0109257 A1 * | 8/2002 | Gaidjiergis | B26F 1/02 425/290 |
| 2009/0301323 A1 * | 12/2009 | Caron | B44B 5/0047 101/23 |

FOREIGN PATENT DOCUMENTS

| | | | |
|---|---|---|---|
| CN | 209007713 | U | 6/2019 |
| EP | 0244348 | A1 | 11/1987 |
| EP | 2860001 | A1 | 4/2015 |
| GB | 1461611 | A | 1/1977 |
| JP | S62-264897 | A | 11/1987 |
| JP | H11-034184 | A | 2/1999 |
| JP | 2001-054897 | A | 2/2001 |
| JP | 2017-213609 | A | 12/2017 |
| KR | 101768496 | B1 | 8/2017 |

OTHER PUBLICATIONS

Extended European Search Report for European Patent Application No. 20885965.2 dated Oct. 26, 2023 (30 sheets).

First Office Action of Chinese Patent Application No. 202080076912.0 issued Feb. 26, 2024 (8 sheets, 7 sheets translation, 15 sheets total).

* cited by examiner

WORKPIECE MACHINING APPARATUS

TECHNICAL FIELD

The present invention relates to a workpiece machining apparatus, and in particular, to a workpiece machining apparatus for machining, with a machining member, a sheet-shaped workpiece placed on a plate-shaped member.

BACKGROUND ART

Patent Document 1 discloses an example of this kind of workpiece machining apparatus. In Patent Document 1, an abutment member 47 is provided above a die 46. The abutment member 47 is a relatively thick plate-shaped member with a flat lower surface 47*a*. The die 46 is fixed to the abutment member 47 with its upper surface 46*f* abutting against the lower surface (abutment surface) 47*a* of the abutment member 47. With this configuration, it is possible to prevent a cutting blade 46*b* and a creaser 46*c* from being pushed upward to protrude above the upper surface 46*f* of a flat plate 46*a* during use of a sheet material machining apparatus 10. In other words, portions of the cutting blade 46*b* and the creaser 46*c* protruding from a lower surface 46*e* of the flat plate 46*a* can be prevented from being shortened, whereby incomplete cutting or insufficient creasing of sheet materials can be prevented.

CITATION LIST

Patent Documents

Patent Document 1: JP 2017-213609 A (see FIG. 4 and the paragraph 0027)

SUMMARY OF INVENTION

Technical Problem

However, since the abutment member 47 is a relatively thick plate-shaped member, it causes inconvenience such that the abutting member 47 itself is heavy, which in turn causes the entire apparatus to be heavy.

Therefore, it is a main object of the present invention to provide a workpiece machining apparatus capable of achieving weight reduction and also capable of reducing the risk that the machining quality of workpieces with a machining member may be deteriorated.

Solution to Problem

The present invention provides a workpiece machining apparatus including: a first plate-shaped member including one first principal surface and the other first principal surface on which a machining member for machining a sheet-shaped workpiece by applying a pressure to a principal surface of the workpiece is to be placed; a second plate-shaped member including one second principal surface and the other second principal surface, the second plate-shaped member being arranged such that the one second principal surface faces the other first principal surface with the machining member interposed therebetween; a first pressure member for applying a first pressure directed from the one first principal surface side toward the other first principal surface side to a portion of the one first principal surface; a second pressure member for applying a second pressure directed from the other second principal surface side toward the one second principal surface side to a portion of the other second principal surface; a first changing unit for changing a portion that the first pressure member pressurizes; and a second changing unit for changing a portion that the second pressure member pressurizes such that the portion that the second pressure member pressurizes is aligned with the portion that the first pressure member pressurizes when viewed from a direction crossing the other second principal surface.

Advantageous Effects of Invention

When the first plate-shaped member or the second plate-shaped member is not flexible, in other words, when the first plate-shaped member or the second plate-shaped member is rigid, the first pressure member and the second pressure member are each required to have a large pressurizing force is order to maintain the machining quality of workpieces. However, when the first plate-shaped member or the second plate-shaped member is flexible, the first plate-shaped member or the second plate-shaped member may be deformed when the position of the first pressure member is changed on the one first principal surface. Accordingly, in the present invention, the portion that the second pressure member pressurizes is changed such that the portion that the second pressure member pressurizes is aligned with the portion that the first pressure member pressurizes when viewed from a direction crossing the other second principal surface. As a result, it is possible to achieve weight reduction and also to reduce the risk that the machining quality of workpieces with the machining member may be deteriorated owing to the deformation of the first plate-shaped member or the second plate-shaped member.

The above-described object, other objects, features, and advantages of the present invention will be more apparent from the following detailed description of embodiments with reference to the accompanying drawings.

DESCRIPTION OF EMBODIMENTS

Overview of Present Embodiments

Figure 1:
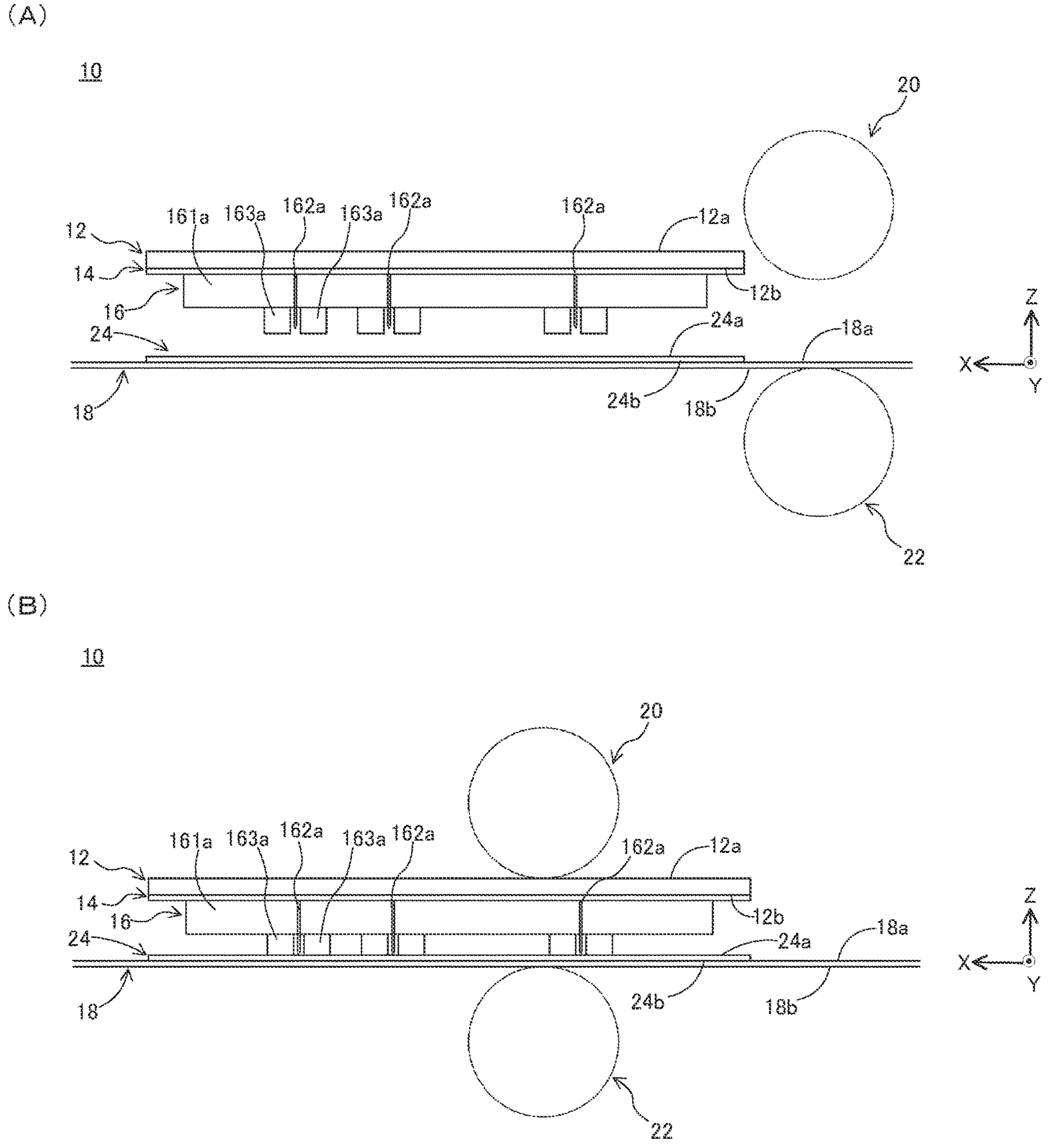
FIG. 1A is a diagram illustrating some of major operations of a workpiece machining apparatus of embodiments of the present invention.
FIG. 1B is a diagram illustrating some other major operations of the workpiece machining apparatus of the embodiments of the present invention.

Referring to FIGS. 1A and 1B, in a workpiece machining apparatus 10 of the embodiments of the present invention, a pressure plate (first plate-shaped member) 12 is, for example, made of steel, and has an upper surface (one first principal surface) 12*a* and a lower surface (the other first principal surface) 12*b*. A blade die (machining member) 16*a* for machining a sheet-shaped workpiece (not shown) by applying a pressure to a principal surface of the workpiece is arranged on the lower surface 12*b*.

The blade die 16*a* includes cutting blades 162*a* for cutting a workpiece, a plate-shaped support member 161*a* for supporting the cutting blades 162*a*, and elastic bodies 163*a* for protecting sharp edges of the cutting blades 162*a* and holding the workpiece from the positive side in the Z-axis direction.

A face plate (second plate-shaped member) 24 is, for example, made of steel. The face plate 24 has an upper surface (one second principal surface) 24*a* and a lower surface (the other second principal surface) 24*b*, and is arranged such that the upper surface 24*a* faces the lower surface 12*b* with the blade die 16*a* interposed therebetween.

A workpiece is, for example, an A3 size synthetic resin sheet, and the length direction, the width direction, and the thickness direction of the workpiece coincide with the X-axis direction, the Y-axis direction, and the Z-axis direction, respectively. In each of the X-axis direction and the Y-axis direction, the size of the workpiece is smaller than the size of the face plate 24. The workpiece is arranged on the upper surface 24*a* in such a manner that the workpiece is within the outer edge of the face plate 24 when viewed from the Z-axis direction.

An upper pressure roller (first pressure member) 20 applies a pressure (first pressure) directed from the upper surface 12*a* side toward the lower surface 12*b* side of the pressure plate 12 to a portion of the upper surface 12*a*. A lower pressure roller (second pressure member) 22 applies a pressure (second pressure) directed from the lower surface 24b side toward the upper surface 24*a* side of the face plate 24 to a portion of the lower surface 24*b*.

In order to change a portion that the upper pressure roller 20 pressurizes, a motor (first changing unit) not shown is provided. Further, a support pole (second changing unit) not shown is provided in order to change a portion that the lower pressure roller 22 pressurizes in response to the change in the portion that the upper pressure roller 20 pressurizes such that the portion that the lower pressure roller 22 pressurizes is aligned with the portion that the upper pressure roller 20 pressurizes when viewed from a direction crossing the lower surface 24*b*.

When the pressure plate 12 or the face plate 24 is not flexible, in other words, when the pressure plate 12 or the face plate 24 is rigid, the upper pressure roller 20 and the lower pressure roller 22 are each required to have a large pressurizing force is order to maintain the machining quality of workpieces. However, when the pressure plate 12 or the face plate 24 is flexible, the pressure plate 12 or the face plate 24 may be deformed when the position of the upper pressure roller 20 is changed on the upper surface 12*a* of the pressure plate 12. Accordingly, in the embodiments of the present invention, the position of the lower pressure roller 22 is changed on the lower surface 24*b* such that the lower pressure roller 22 is arranged at a position aligned with the upper pressure roller 20 when viewed from a direction crossing the lower surface 24*b*. As a result, it is possible to achieve weight reduction and also to reduce the risk that the machining quality of workpieces with the blade die 16*a* may be deteriorated owing to the deformation of the pressure plate 12 or the face plate 24.

Detailed Description of First Embodiment

Figure 2:
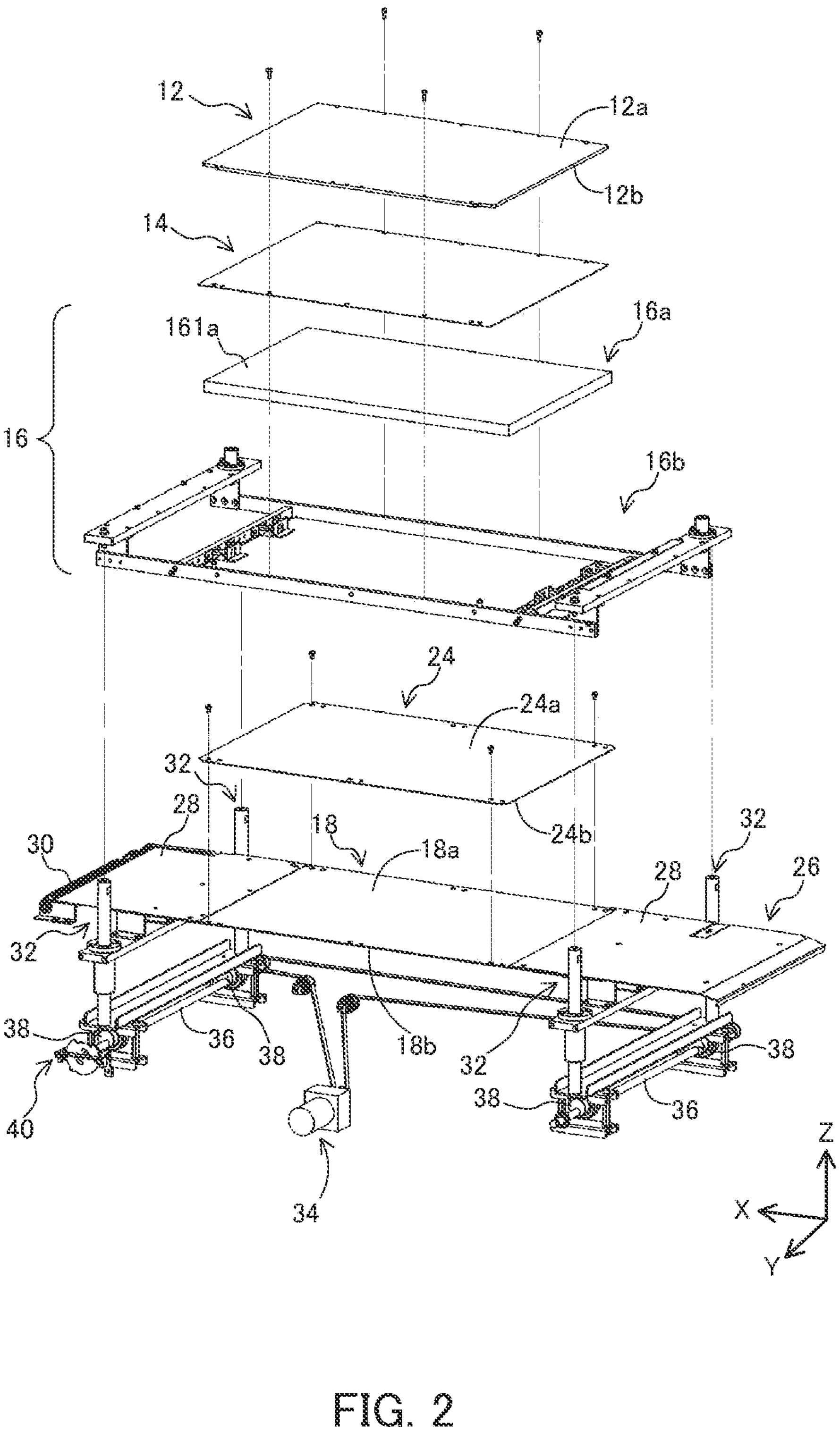
FIG. 2 is an exploded perspective view showing a part of the structure according to a first embodiment as viewed obliquely in a state of being disassembled.

Referring now to FIG. 2, the workpiece machining apparatus 10 of the first embodiment is a so-called Thomson-type machining apparatus, and includes a pedestal 26 to which a base plate 18 made of, for example, steel is attached. An upper surface 18*a* and a lower surface 18*b* of the base plate 18 face the positive side and the negative side in the Z-axis direction, respectively. In the Y-axis direction, the size of the base plate 18 is substantially the same as the size of the face plate 24. On the other hand, in the X-axis direction, the size of the base plate 18 is much larger than the size of the face plate 24. The face plate 24 is attached to the upper surface 18*a* of the base plate 18 with fixing members such as screws in such a manner that the XY coordinates of the center of the face plate 24 coincide with the XY coordinates of the center of the base plate 18.

To each of two regions that are on the upper surface 18*a* of the base plate 18 and not covered by the face plate 24, a base plate cover 28 made of, for example, steel is attached. That is, in one of the two regions (=the region on the negative side in the X-axis direction), the base plate cover 28 is attached to the upper surface of the one of the regions with fixing members such as screws in such a manner that the XY coordinates of the center of the region coincide with the XY coordinates of the center of the base plate cover 28. Similarly, in the other one of the two regions (=the region on the positive side in the X-axis direction), the base plate cover 28 is attached to the upper surface of the other one of the regions with fixing members such as screws in such a manner that the XY coordinates of the center of the region coincide with the XY coordinates of the center of the base plate cover 28.

The blade die 16*a* has a plurality of cells (not shown) arranged in a matrix, and each of the cells includes the above-described cutting blade 162*a* and elastic bodies 163*a*. The plurality of cells have the same size in each of the X-axis direction, the Y-axis direction, and the Z-axis direction. The blade die 16*a* constitutes a blade unit 16 together with a blade die frame 16*b* to which the blade die 16*a* is attached. In each of the X-axis direction and the Y-axis direction, the size of the blade die 16*a* is substantially the same as the size of the face plate 24. The blade die frame 16*b* and thus also the blade die unit 16 are attached to the pedestal 26 with four blade die unit stays 32 in such a manner that the XY coordinates of the center of the blade die 16*a* coincide with the XY coordinates of the center of the face plate 24 and that the blade die 16*a* is on the positive side with respect to the face plate 24 in the Z-axis direction. The blade die unit 16 is movable in the Z-axis direction, in other words, can be lifted and lowered.

The four blade die unit stays 32 are provided at four positions that do not overlap the face plate 24 when viewed from the positive side in the Z-axis direction (specifically, at a position that is on the negative side in the X-axis direction and the negative side in the Y-axis direction with respect to the face plate 24, a position on the negative side in the X-axis direction and the positive side in the Y-axis direction with respect to the face plate 24, a position on the positive side in the X-axis direction and the negative side in the Y-axis direction with respect to the face plate 24, and a position on the positive side in the X-axis direction and the positive side in the Y-axis direction with respect to the face plate 24).

A protective plate 14 made of stainless steel is arranged between the blade die 16*a* and the pressure plate 12 arranged above the blade die 16*a*. Typically, a pressure applied to the pressure plate 12 is adjusted by attaching a tape for smoothing unevenness to an upper surface of the blade die 16*a*. However, the tape may be damaged when attaching or detaching the pressure plate 12, which is heavy. To address this issue, in the first embodiment, the protective plate 14 is arranged between the lower surface 12*b* of the pressure plate 12 and the upper surface of the blade die 16*a*.

In the Z-axis direction, the size of the pressure plate 12 is larger than the size of the base plate 18. This can prevent the deformation of the blade die 16*a* as much as possible.

In each of the X-axis direction and the Y-axis direction, the size of the protective plate 14 is substantially the same as the size of each of the support member 161*a* and the pressure plate 12. In the Z-axis direction, the size of the pressure plate 12 is smaller than the size of the support member 161*a*, and the size of the protective plate 14 is smaller than the size of the pressure plate 12.

The protective plate 14 is attached to the lower surface 12*b* of the pressure plate 12 with fixing members such as screws in such a manner that the XY coordinates of the center of the protection plate 14 coincide with the XY coordinates of the center of the pressure plate 12. The pressure plate 12 is attached to the upper surface of the support member 161*a* with fixing members such as screws in such a manner that the XY coordinates of the center of the pressure plate 12 coincide with the XY coordinates of the center of the support member 161*a*.

Referring back to the pedestal 26, a workpiece discharge roller 30 extending along the Y-axis is attached to an end portion of the base plate 18 on the positive side in the X-axis direction. Also, a blade die unit lifting/lowering motor 34 for lifting and lowering the blade die unit 16 supported by the four blade die unit stays 32 is attached to the pedestal 26.

Four blade die unit lifting/lowering cams 38, which all have the same size, are provided in the vicinity of the four blade die unit stays 32, respectively. When viewed from the positive side in the Y-axis direction, two blade die unit lifting/lowering cams 38 provided on the negative side in the X-axis direction are completely aligned with each other and two blade die unit lifting/lowering cams 38 provided on the positive side in the X-axis direction are also completely aligned with each other.

Two cam shafts 36 both extend along the Y-axis. One of the two cam shafts 36 is a shaft for coupling the two blade die unit lifting/lowering cams 38 provided on the negative side in the X-axis direction, and the other one of the cam shafts 36 is a shaft for coupling the two blade die unit lifting/lowering cams 38 provided on the positive side in the X-axis direction.

It is to be noted that, for each of these two cam shafts 36, the XZ coordinates of the center thereof are different from the XZ coordinates of the centers of the respective two blade die unit lifting/lowering cams 38 to which the cam shaft 36 is coupled. The cam shafts 36 are each rotatable around their axes without causing deviation of at least the XZ coordinates. As a result, the two blade die unit lifting/lowering cams 38 move around the axis of the cam shaft 36 in a state of being completely aligned with each other when viewed from the Y-axis direction.

Outer peripheral surfaces of the blade die unit lifting/lowering cams 38 abut against end faces of the four blade die unit stays 32 on the negative side in the Z-axis direction, respectively. The above-described two cam shafts 36 are both rotated around their axes by the blade die unit lifting/lowering motor 34. As a result, the blade die unit 16 is lifted and lowered. The amount of rotation, i.e., the rotational position of the cam shafts 36 is detected by a cam position detection sensor 40.

Figure 3:
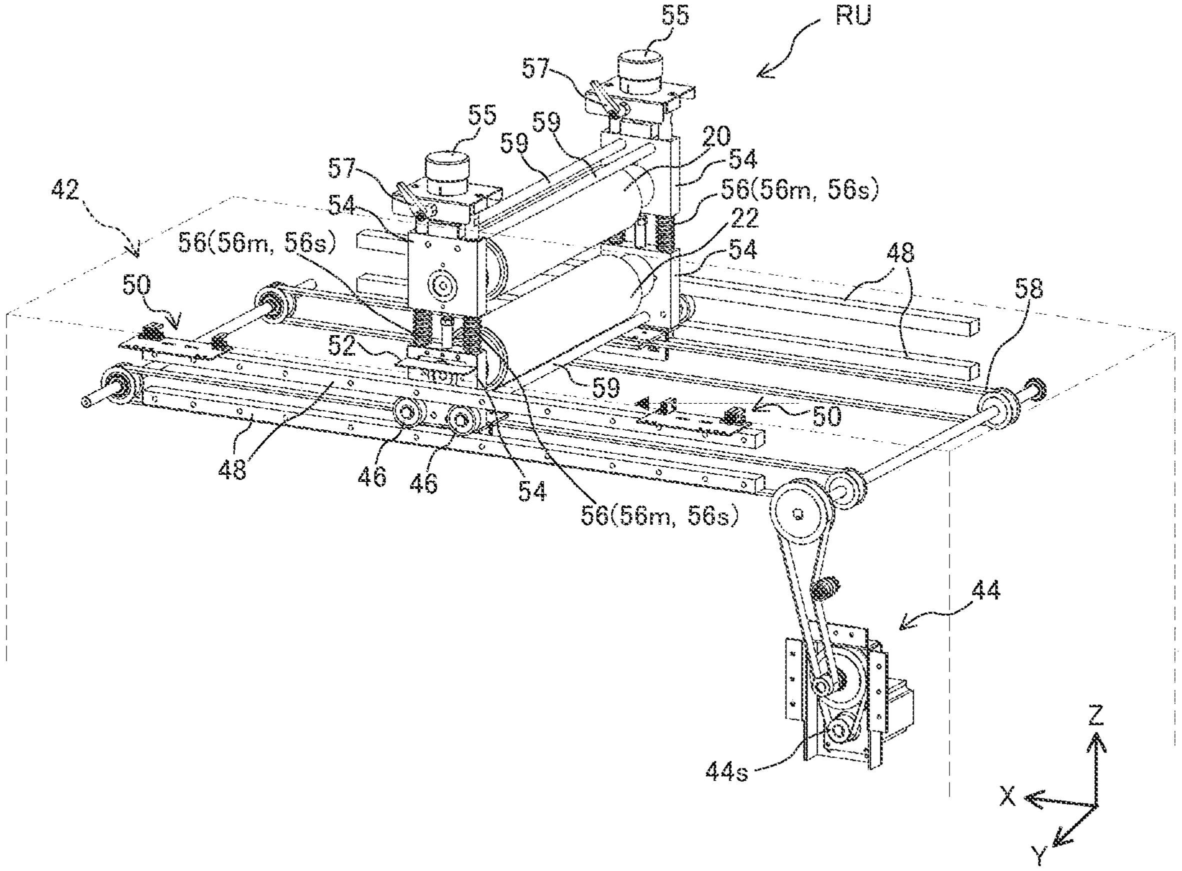
FIG. 3 is an exploded perspective view showing another part of the structure according to the first embodiment as viewed obliquely in a state of being disassembled.

Referring now to FIG. 3, the upper pressure roller 20 and the lower pressure roller 22 constitute a roller unit RU together with four pressure roller bearings 54 (made of a material such as steel, for example) each formed in a plate shape. Specifically, the upper pressure roller 20 extends along the Y-axis and is rotatably supported by, of the four pressure roller bearings 54, two pressure roller bearings 54 arranged on the positive side in the Z-axis direction. The lower pressure roller 22 extends along the Y-axis and is rotatably supported by, of the four pressure roller bearings 54, two pressure roller bearings 54 arranged on the negative side in the Z-axis direction.

The upper pressure roller 20 and the lower pressure roller 22 have the same size, including the diameter. The length of the outer periphery of the upper pressure roller 20 is much shorter than the length of the pressure plate 12 in the X-axis direction. Also, the length of the outer periphery of the lower pressure roller 22 is much shorter than the length of the face plate 24 in the X-axis direction. The four pressure roller bearings 54 have the same size. Of the four pressure roller bearings 54, the XY coordinates of the centers of the two pressure roller bearings 54 arranged on the negative side in the Y-axis direction coincide with each other, and also, the XY coordinates of the centers of the two pressure roller bearings 54 arranged on the positive side in the Y-axis direction coincide with each other. As a result, the upper pressure roller 20 and the lower pressure roller 22 are completely aligned with each other when viewed from the positive side in the Z-axis direction.

The four pressure roller bearings 54 are supported by four pressure roller support poles 56 each extending along the Z-axis. Specifically, the two pressure roller bearings 54 arranged on the negative side in the Y-axis direction are supported by, of the four pressure roller support poles 56, two pressure roller support poles 56 arranged on the negative side in the Y-axis direction. The two pressure roller bearings 54 arranged on the positive side in the Y-axis direction are supported by, of the four pressure roller support poles 56, two pressure roller support poles 56 arranged on the positive side in the Y-axis direction.

Each of the four pressure roller support poles 56 is constituted by a support pole main body 56*m* and a spring 56*s* wound around the support pole main body 56*m*. Among the four pressure roller support poles 56, the sizes of the support pole main bodies 56*m* are the same and the sizes of the springs 56*s* are the same.

The four pressure roller bearings 54 are supported by four pressure roller frames 59. The four pressure roller frames 59 are all stick-shaped members (made of steel, for example) with the same size, and they extend along the Y-axis. The two pressure roller bearings 54 on the positive side in the Z-axis direction are supported by, of the four pressure roller frames 59, two pressure roller frames 59 on the positive side in the Z-axis direction. The two pressure roller bearings 54 on the negative side in the Z-axis direction are supported by, of the four pressure roller frames 59, two pressure roller frames 59 on the negative side in the Z-axis direction.

Two pressure adjustment handles 55 each formed in a substantially cylindrical shape are arranged above, of the four pressure roller bearings 54, the two pressure roller bearings 54 on the positive side in the Z-axis direction. The upper pressure roller 20 applies a pressure directed from the positive side toward the negative side in the Z-axis direction, and the lower pressure roller 22 applies a pressure directed from the negative side toward the positive side in the Z-axis direction. The magnitudes of these pressures are adjusted by operating the above-described two pressure adjustment handles 55. At this time, of the two pressure adjustment handles 55, operation of the pressure adjustment handle 55 on the negative side in the Y-axis direction increases or decreases the pressure on the negative side, and operation of the pressure adjustment handle 55 on the positive side in the Y-axis direction increases or decreases the pressure on the positive side. This enables pressure adjustment according to the load applied in machining of a workpiece.

The two pressure adjustment handles 55 each have a handle fixing knob 57 attached thereto. The amount of rotation of one of the pressure adjustment handles 55 is fixed by operating the handle fixing knob 57 attached thereto, and the amount of rotation of the other pressure adjustment handle 55 is fixed by operating the handle fixing knob 57 attached thereto.

In the pressure roller bearing 54 that is on the positive side in the Y-axis direction and the negative side in the Z-axis direction, a plate-shaped sensor dog 52 is attached to a principal surface on the positive side in the Y-axis direction. To each of the two pressure roller bearings 54 on the negative side in the Z-axis direction, two guide rollers 46 are attached. More specifically, of these two pressure roller bearings 54, in the pressure roller bearing 54 on the positive side in the Y-axis direction, two guide rollers 46 that are lined up along the X-axis are attached to a principal surface on the positive side in the Y-axis direction. Further, of these two pressure roller bearings 54, in the pressure roller bearing 54 on the negative side in the Y-axis direction, two guide rollers 46 that are lined up along the X-axis are attached to a principal surface on the negative side in the Y-axis direction.

Two guide rails 48 having the same size are attached to a rectangular main body frame 42. One of the two guide rails 48 extends along the X-axis on an inner wall surface on the negative side in the Y-axis direction, and the other guide rail 48 extends along the X-axis on an inner wall surface on the positive side in the Y-axis direction. The above-described two guide rollers 46 are each supported by these two guide rails 48. To the guide rail 48 on the positive side in the Y-axis direction, two sensor units 50 for detecting the sensor dog 52 are attached. One of these two sensor units 50 is attached to a negative-side end portion of the guide rail 48 in the X-axis direction, and the other sensor unit 50 is attached to a positive-side end portion of the guide rail 48 in the X-axis direction.

A roller unit moving belt 58 engages with each of the roller unit RU and a roller unit moving motor 44. The roller unit moving motor 44 is a motor for moving the roller unit RU via the roller unit moving belt 58 and has a motor shaft 44*s* extending along the Y-axis. When the motor shaft 44*s* rotates clockwise when viewed from the positive side in the Y-axis direction, the roller unit RU is moved from the positive side to the negative side in the X-axis direction along the guide rails 48. On the other hand, when the motor shaft 44*s* rotates counterclockwise when viewed from the positive side in the Y-axis direction, the roller unit RU is moved from the negative side to the positive side in the X-axis direction along the guide rails 48.

Figure 4:
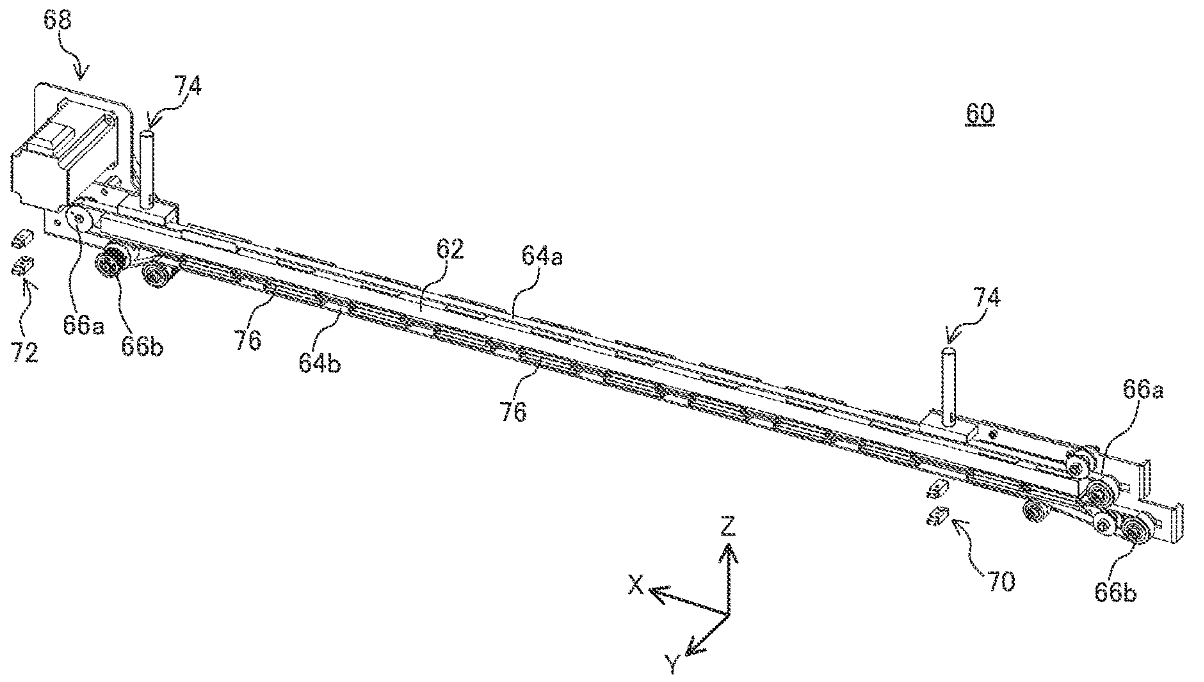
FIG. 4 is an exploded perspective view showing still another part of the structure according to the first embodiment as viewed obliquely in a state of being disassembled.

Referring now to FIG. 4, a workpiece conveying mechanism 60 includes a workpiece conveying frame 62 extending along the X-axis, two upper conveyor belt pulleys 66*a* arranged at positions holding the workpiece conveying frame 62 therebetween in the X-axis direction, two lower conveyor belt pulleys 66*b* arranged in the vicinity of the two upper belt pulleys 66*a*, respectively, and a workpiece conveying motor 68 for rotating, of the two upper conveyor belt pulleys 66*a*, an upper belt pulley 66*a* on the positive side in the X-axis direction.

The two upper conveyor belt pulleys 66*a* and the two lower conveyor belt pulleys 66*b* each have a shaft extending along the Y-axis, and the workpiece conveying motor 68 has a motor shaft (not shown) extending along the Y-axis. An upper conveyor belt 64*a* and a lower conveyor belt 64*b* are both endless belts. The upper conveyor belt 64*a* is looped over the two upper conveyor belt pulleys 66*a*, and the lower conveyor belt 64*b* is looped over the two lower conveyor belt pulleys 66*b*. The outer peripheral surface of a portion of the lower conveyor belt 64*b* that lies in the positive-side section in the Z-axis direction abuts against the outer peripheral surface of a portion of the upper conveyor belt 64*a* that lies in the negative-side section in the Z-axis direction.

As a result, when the motor shaft of the workpiece conveying motor 68 rotates, the upper conveyor belt 64*a* is moved around the workpiece conveying frame 62 accompanying the rotation of the motor shaft. Further, owing to frictional force with the upper conveyor belt 64*a*, the lower conveyor belt 64*b* is moved along the upper conveyor belt 64*a* on the negative side of the upper conveyor belt 64*a* in the Z-axis direction.

For example, when the motor shaft of the workpiece conveying motor 68 rotates clockwise when viewed from the positive side in the Y-axis direction, a portion of the upper conveyor belt 64*a* that lies in the negative-side section in the Z-axis direction and a portion of the lower conveyor belt 64*b* that lies in the positive-side section in the Z-axis direction move from the negative side toward the positive side in the X-axis direction.

Inconvenience that a portion of the lower conveyor belt 64*b* that lies in the positive-side section and a portion of the lower conveyor belt 64*b* that lies in the negative-side section in the Z-axis direction may come into contact with each other is solved by a plurality of conveyor belt retainers 76 arranged on the inner peripheral surface of the lower conveyor belt 64*b*.

Two workpiece conveying mechanism stays 74 are stays for attaching the workpiece conveying mechanism 60 to the main body frame 42 shown in FIG. 3. One of the workpiece conveying mechanism stays 74 is arranged above the workpiece conveying frame 62 and at a position slightly displaced from a negative-side end portion toward a positive-side end portion in the X-axis direction. The other workpiece conveying mechanism stay 74 is arranged above the workpiece conveying frame 62 and at a position slightly displaced from the positive-side end. portion toward the negative-side end portion in the X-axis direction. The workpiece conveying mechanism 60 is attached to the main body frame 42 with the two workpiece conveying mechanism stays 74 in such a manner that the workpiece conveying frame 62 extends along the X-axis in the vicinity of a negative-side end portion of the base plate 18 shown in FIG. 3 in the Y-axis direction.

A workpiece feeder (not shown) for feeding a workpiece to the workpiece machining apparatus 10 is provided at a position on the negative side with respect to the main body frame 42 in the X-axis direction. A negative-side end portion of the fed workpiece in the Y-axis direction is held between the outer peripheral surface of a portion of the upper conveyor belt 64*a* that lies in the negative-side section in the Z-axis direction and the outer peripheral surface of a portion of the lower conveyor belt 64*b* that lies in the positive-side section in the Z-axis direction, and is conveyed from the negative side toward the positive side in the X-axis direction by the workpiece conveying motor 68.

A workpiece detection sensor 70 is a sensor for detecting a leading end portion (strictly speaking, an end portion that is on the positive side in the X-axis direction and on the negative side in the Y-axis direction) of a workpiece fed to the workpiece machining apparatus 10, and is arranged below the workpiece conveying frame 62 and at a position aligned with the workpiece conveying mechanism stay 74 that is on the negative side in the X-axis direction when viewed from the negative side in the Z-axis direction.

A discharge detection sensor 72 is a sensor for detecting a rear end portion (strictly speaking, an end portion that is on the negative side in each of the X-axis direction and the Y-axis direction) of a workpiece discharged from the workpiece machining apparatus 10, and is arranged at a position aligned with the workpiece conveying motor 68 when viewed from the negative side in the Z-axis direction.

Figure 5:
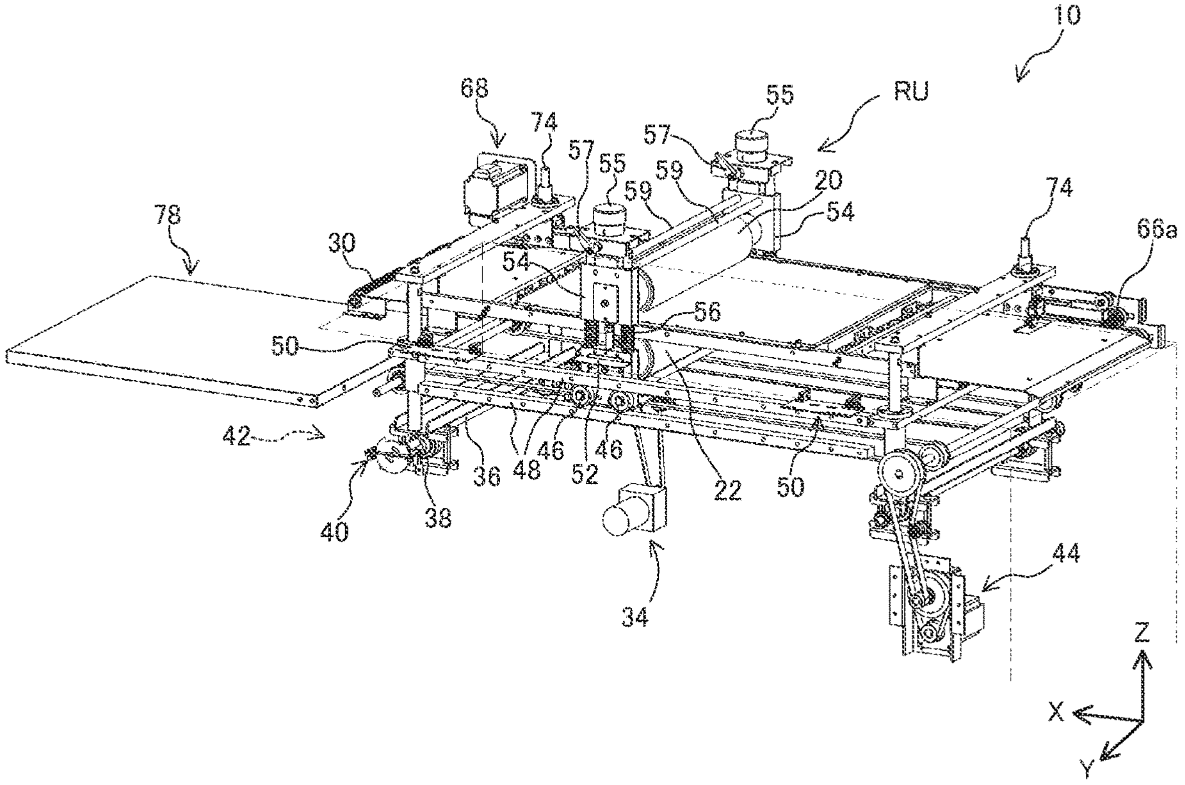
FIG. 5 is a perspective view showing a part of the structure according to the first embodiment as viewed obliquely.

Referring now to FIG. 5, a rectangular plate-shaped workpiece receiver 78 is provided at a position on the positive side with respect to the main body frame 42 in the X-axis direction. The upper surface of the workpiece receiver 78 faces the positive side in the Z-axis direction, and the lower surface of the workpiece receiver 78 faces the negative side in the Z-axis direction. Workpieces that have been machined with the blade die unit 16 and then discharged from the workpiece machining apparatus 10 are stacked on the upper surface of the workpiece receiver 78.

Figure 6:
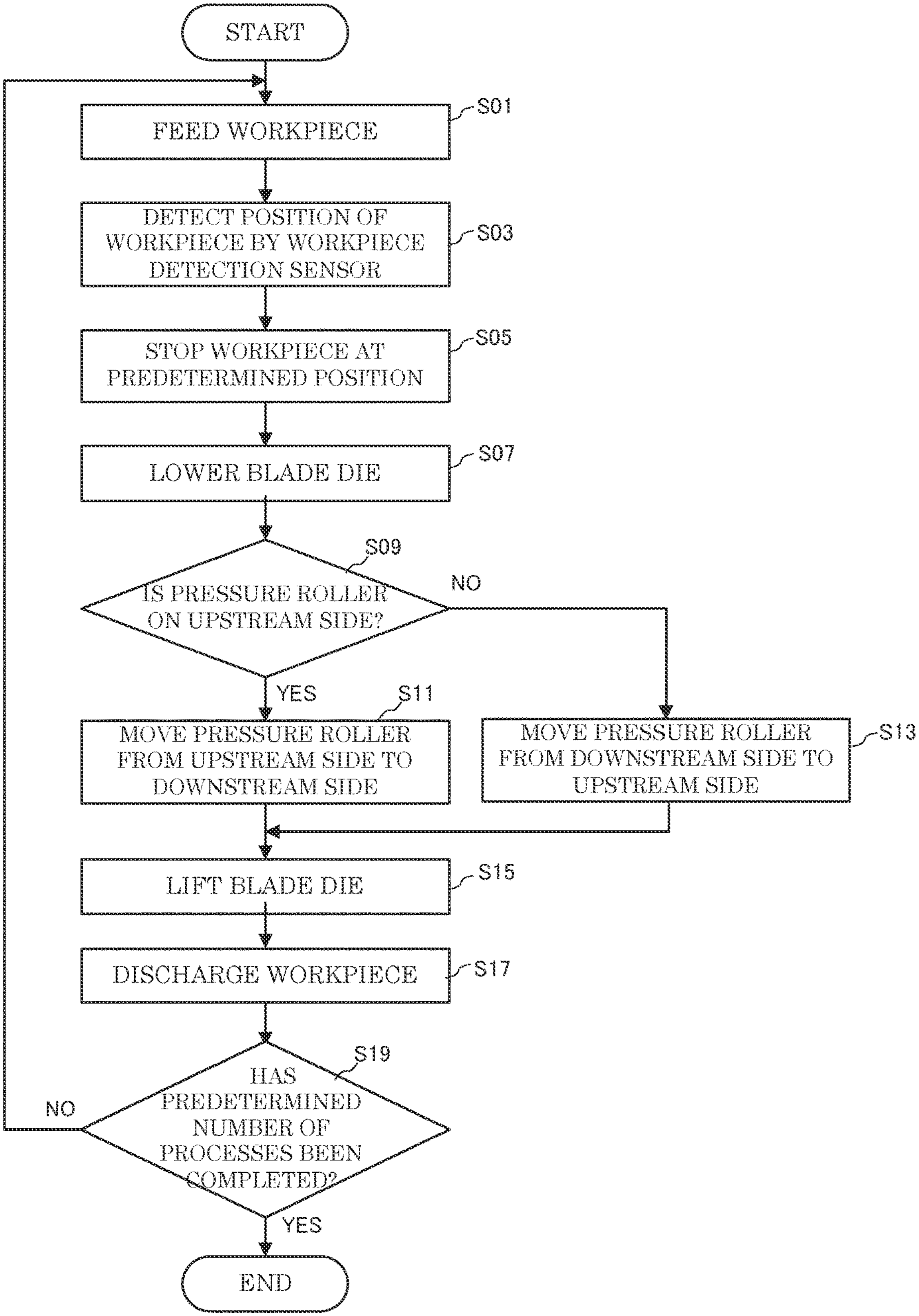
FIG. 6 is a flowchart illustrating some of operations of a control circuit provided in the first embodiment.

The workpiece machining apparatus 10 includes a control circuit (not shown) having a workpiece machining program installed therein. The control circuit executes a process shown in FIG. 6 on the basis of the workpiece machining program.

In the step S01, the control circuit gives the workpiece feeder an instruction to feed a workpiece to the workpiece machining apparatus 10. As a result, the workpiece is fed to the workpiece machining apparatus 10 from the workpiece feeder. In the step S03, the control circuit detects the position of the workpiece on the basis of an output from the workpiece detection sensor 70. In the step S05, the control circuit controls the workpiece conveying motor 68 so as to start conveying the workpiece and to stop conveying the workpiece at a position where the workpiece is to be placed on the upper surface of the face plate 24. In the step S07, the control circuit controls the blade die unit lifting/lowering motor 34 so as to lower the blade die unit 16. At this time, the pressure plate 12 and the protective plate 14, which are integrated with the blade die unit 16, are also lowered.

In the step S09, the control circuit determines whether the roller unit RU is on the upstream side (the negative side in the X-axis direction) on the basis of the output from the sensor unit 50 shown in FIG. 3. When the control circuit determines that the roller unit RU is on the upstream side, the process flow proceeds to the step S11. On the other hand, when the control circuit does not determine that the roller unit RU is on the upstream side, i.e., when the control circuit determines that the roller unit RU is on the downstream side (the positive side in the X-axis direction), the process flow proceeds to the step S13.

In the step S11, the control circuit controls the roller unit moving motor 44 so as to move the roller unit RU from the upstream side to the downstream side by a predetermined distance corresponding to the size of the workpiece in the X-axis direction. On the other hand, in the step S13, the control circuit controls the roller unit moving motor 44 so as to move the roller unit RU from the downstream side to the upstream side by the predetermined distance.

The roller unit RU includes the upper pressure roller 20 and the lower pressure roller 22, which are coupled to each other by the pressure roller support poles 56. When the roller unit moving motor 44 is rotated, the upper pressure roller 20 is moved along the upper surface 12*a* of the pressure plate 12 and the lower pressure roller 22 is moved along the lower surface 18*b* of the base plate 18. As a result, the workpiece is subjected to punching.

At least in the step of moving the portion that the roller unit RU pressurizes, the position of the pressure plate 12 at least in the direction along the upper surface 12*a* of the pressure plate 12 is fixed and the position of the base plate 18 at least in the direction along the lower surface 18*b* of the base plate 18 is fixed. The amount of rotation of the upper pressure roller 20 and the amount of rotation of the lower pressure roller 22 from the step of feeding the workpiece to the step of discharging the workpiece are greater than the amounts corresponding to the lengths of the outer peripheries of these rollers, respectively.

After completion of the processes of the step S11 or S13, the process flow proceeds to the step S15, in which the control circuit controls the blade die unit lifting/lowering motor 34 so as to lift the blade die unit 16. At this time, the pressure plate 12 and the protective plate 14 are also lifted. In the step S17, the control circuit controls the workpiece conveying motor 68 so as to discharge the workpiece after being subjected to punching to the workpiece receiver 78.

In the step S19, the control circuit determines whether punching has been completed for a predetermined number of workpieces on the basis of the output from the discharge detection sensor 72. When the control circuit does not determine that punching has been completed for the predetermined number of workpieces, the process flow returns to the step S01. On the other hand, when the control circuit determines that punching has been complete for the predetermined number of workpieces, the process flow is terminated.

Detailed Description of Second Embodiment

Figure 7:
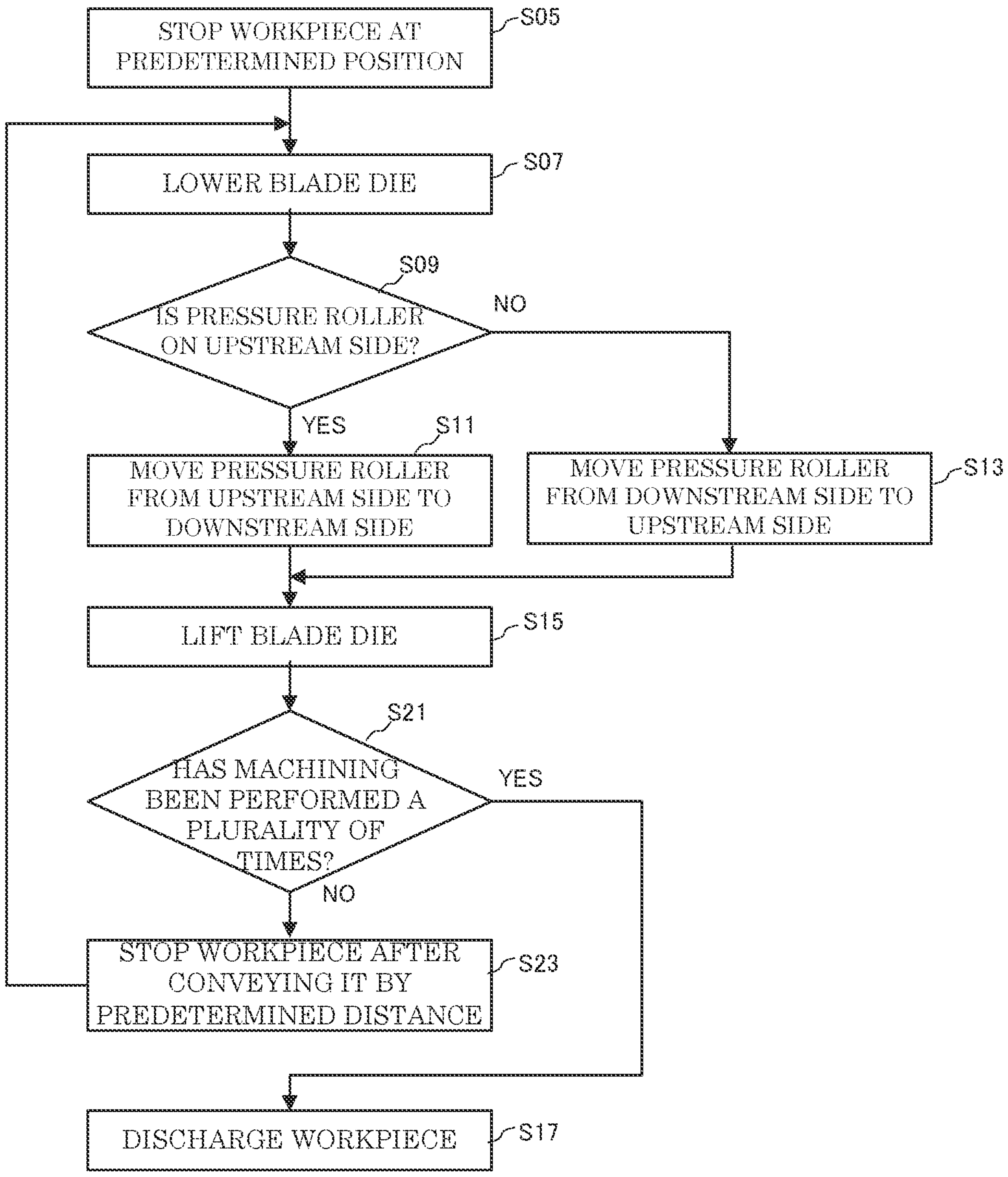
FIG. 7 is a flowchart illustrating some other operations of the control circuit provided in the first embodiment.

A workpiece machining apparatus 10 of the second embodiment has the same configuration as the workpiece machining apparatus 10 of the first embodiment, except that a plurality of cells lined up along, of the X-axis and the Y-axis, only the Y-axis are provided in a blade die 16*a* and that a workpiece machining program further includes codes corresponding to the steps S21 and S23 shown in FIG. 7. Accordingly, redundant explanations regarding the same configuration are omitted.

Referring now to FIG. 7, after completion of the process of the step S15, the process flow proceeds to the step S21, in which the control circuit determines whether punching has been performed a predetermined number of times for the workpiece (=the number of times corresponds to the number of cells lined up along the X-axis in the first embodiment) on the basis of the output from the sensor unit 50. When the control circuit does not determine that the punching has been performed the predetermined number of times, the process flow proceeds to the step S23. In the step S23, the control circuit controls the workpiece conveying motor 68 shown in FIG. 3 so as to move the workpiece from the upstream side to the downstream side by the distance corresponding to the size of a single cell in the X-axis direction. After completion of the process in the step S23, the process flow returns to the step S07. On the other hand, when the control circuit determines that punching has been performed the predetermined number of times in the step S21, the process flow proceeds to the step S17.

Effects of Embodiments

According to the embodiments of the present invention, the pressure plate 12 has the upper surface 12*a* and the lower surface 12*b*. The blade die unit 16 for machining a sheet-shaped workpiece by applying a pressure to a principal surface of the workpiece is arranged on the lower surface 12*b*. The face plate 24 has the upper surface 24*a* and the lower surface 24*b*, and is arranged such that the upper surface 24*a* faces the lower surface 12*b* with the blade die unit 16 interposed therebetween. The upper pressure roller 20 applies a pressure directed from the upper surface 12*a* side toward the lower surface 12*b* side of the pressure plate 12 to a portion of the upper surface 12*a*. The lower pressure roller 22 applies a pressure directed from the lower surface 24*b* side toward the upper surface 24*a* side of the face plate 24 to a portion of the lower surface 24*b*.

The roller unit moving motor 44 is provided to change a portion that the upper pressure roller 20 pressurizes. The pressure roller support poles 56 are provided to change a portion that the lower pressure roller 22 pressurizes in response to the change in the portion that the upper pressure roller 20 pressurizes such that the portion that the lower pressure roller 22 pressurizes is aligned with the portion that the upper pressure roller 20 pressurizes when viewed from a direction crossing the lower surface 24*b*.

When the pressure plate 12 or the face plate 24 is not flexible, in other words, when the pressure plate 12 or the face plate 24 is rigid, the upper pressure roller 20 and the lower pressure roller 22 are each required to have a large pressurizing force is order to maintain the machining quality of workpieces. However, when the pressure plate 12 or the face plate 24 is flexible, the pressure plate 12 or the face plate 24 may be deformed when the position of the upper pressure roller 20 is changed on the upper surface 12*a* of the pressure plate 12. Accordingly, in the embodiments of the present invention, the position of the lower pressure roller 22 is changed on the lower surface 24*b* such that the lower pressure roller 22 is arranged at a position aligned with the upper pressure roller 20 when viewed from a direction crossing the lower surface 24*b*. As a result, it is possible to achieve weight reduction and also to reduce the risk that the machining quality of workpieces with the blade die 16*a* may be deteriorated owing to the deformation of the pressure plate 12 or the face plate 24.

Further, according the embodiments of the present invention, the roller unit moving motor 44 is a motor for moving the upper pressure roller 20 along the upper surface 12*a* of the pressure plate 12, and the pressure roller support poles 56 are support poles for moving the lower pressure roller 22 along the lower surface 24*b* of the face plate 24. By moving the upper pressure roller 20 along the upper surface 12*a*, the upper pressure roller 20 continuously applies a pressure to the upper surface 12*a*. Thus, in the embodiments of the present invention, the lower pressure roller 22 is moved along the lower surface 24*b*, whereby the lower pressure roller 22 continuously applies a pressure to the lower surface 24*b*. As a result, through simple controlling operations of moving the rollers along the principal surfaces, it is possible to reduce the risk that the machining quality of workpieces with the blade die unit 16 may be deteriorated.

Further, according the embodiments of the present invention, the position of the pressure plate 12 at least in a direction along the upper surface 12*a* is fixed in the step of changing the portion that the upper pressure roller 20 pressurizes. Also, the position of the face plate 24 at least in a direction along the lower surface 24*b* is fixed in the step of changing the portion that the lower upper pressure roller 22 pressurizes. This can improve the accuracy of machining workpieces.

Furthermore, according the embodiments of the present invention, the upper pressure roller 20 rolls on the upper surface 12*a* of the pressure plate 12, and the amount of rotation of the upper pressure roller 20 from the step of feeding the workpiece to the step of discharging the workpiece is greater than the amount corresponding to the length of the outer periphery of the upper pressure roller 20. With this configuration, it is possible to machine a workpiece even when the length of the workpiece in the rolling direction of the upper pressure roller 20 is greater than the length of the outer periphery of the upper pressure roller 20.

Furthermore, according to the embodiments of the present invention, the position of a workpiece fed between the upper surface 24*a* of the face plate 24 and the blade die unit 16 is detected by the workpiece detection sensor 70. On the basis of the result of detection by the workpiece detection sensor 70, the roller unit moving motor 44 starts to change the portion that the upper pressure roller 20 pressurizes and then also the portion that the lower pressure roller 22 pressurizes. Thus, it is possible to perform machining of automatically fed workpieces.

Furthermore, according to the embodiments of the present invention, the workpiece conveying motor 68 conveys a workpiece fed between the upper surface 24*a* of the face plate 24 and the blade die unit 16 by a predetermined distance. The roller unit moving motor 44 changes the direction toward which the pressurized portion is changed every time a workpiece is conveyed by the predetermined distance. This can reduce the time required for machining workpieces.

Furthermore, according to the embodiments of the present invention, the workpiece conveying motor 68 conveys a workpiece from the negative side toward the positive side in the X-axis direction, and the above-described predetermined length is fixed regardless of the length of the blade die unit 16 in the X-axis direction. This can reduce the cost for blade die production.

Modifications

Modifications to the above-described embodiments will be described below.

(1) In the above-described embodiments, the portion that the lower pressure roller 22 pressurizes is changed such that the portion that the lower pressure roller 22 pressurizes is aligned with the portion that the upper pressure roller 20 pressurizes when viewed from a direction crossing the lower surface 24*b*. In this case, the lower pressure roller 22 may be coupled to the upper pressure roller 20 in such a manner that the lower pressure roller 22 can perform pendulum-like reciprocating motion when viewed from the positive side in the Y-axis direction. The portion that the lower pressure roller 22 pressurizes may be completely or partially aligned with the portion that the upper pressure roller 20 pressurizes. Further, the portion that the lower pressure roller 22 pressurizes may be changed such that the portion that the lower pressure roller 22 pressurizes is aligned with the portion that the upper pressure roller 20 pressurizes when viewed from a direction orthogonal to the lower surface 24*b*.

(2) In the above-described embodiments, the upper pressure roller 20 and the lower pressure roller 22 have the same size, including the diameter. However, at least the diameters of the upper pressure roller 20 and the lower pressure roller 22 may be different from each other.

(3) In the above-described embodiments, the blade die unit 16 is arranged on the lower surface 12*b* of the pressure plate 12. However, the blade die unit 16 may be arranged on the upper surface 24*a* of the face plate 24.

(4) In the above-described embodiments, the upper pressure roller 20 and the lower pressure roller 22 are used for pressure application. However, instead of the rollers, pressure members in a plate shape, spherical shape, or the like may be used for pressure application. In this case, a pressure member in a plate shape, spherical shape, or the like may be used instead of only one of the upper pressure roller 20 and the lower pressure roller 22, and the pressure member in a plate shape, spherical shape, or the like may receive a pressure applied by the other one of the upper pressure roller 20 and the lower pressure roller 22.

(5) In the above-described embodiments, workpieces are conveyed in a direction parallel to the feed direction of the workpieces. However, the direction in which workpieces are conveyed need not be parallel to the feed direction of the workpieces. For example, the direction in which workpieces are conveyed may be a directing crossing (including a direction orthogonal to) the feed direction of the workpieces.

(6) In the above-described embodiments, the moving direction of the roller unit RU is parallel to the feed direction of workpieces. However, the moving direction of the roller unit RU need not be parallel to the feed direction of workpieces. For example, the moving direction of the roller unit RU may be a directing crossing (including a direction orthogonal to) the feed direction of workpieces.

(7) In the above-described embodiments, in one reciprocating motion of the roller unit RU, the amount of movement of the roller unit RU in the positive direction is the same as the amount of movement of the roller unit RU in the negative direction. However, the amount of movement in one of the positive direction and the negative direction may be slightly different from the amount of movement in the other direction as long as the difference falls within the range where the machining quality of workpieces is ensured.

(8) In the above-described embodiments, the roller unit RU is moved along the X-axis. However, the moving direction of the roller unit RU may be changed according to the type of sheet, the number of times machining is performed, and the like.

(9) In the above-described embodiments, workpieces are made of synthetic resin. However, workpieces may be made of fabric or paper.

(10) In the above-described embodiments, the blade die unit 16 is used to perform punching of workpieces. However, stripping, embossing, transfer processing, or the like may be performed instead of punching.

(11) In the above-described embodiments, various plates including the pressure plate 12 and the face plate 24 are made of steel. However, these plates may be made of aluminum.

(12) In the above-described embodiments, a plurality of cells having the same size are provided in the blade die 16*a*. However, the plurality of cells may have different sizes.

(13) In the above-described embodiment (second embodiment), a plurality of cells lined up along, of the X-axis and Y-axis, only the X-axis are provided in the blade die 16*a*. However, a plurality of cells lined up along, of the X-axis and Y-axis, only the Y-axis may be provided in the blade die 16*a*.

Supplementary Notes

Regarding the matters described in each of the above-described embodiments, the following supplementary notes are provided.

Supplementary Note 1

Viewed from an aspect of one embodiment of the present disclosure, the present invention provides a workpiece machining apparatus including: a first plate-shaped member (12) including one first principal surface (12*a*) and the other first principal surface (12*b*) on which a machining member (16*a*) for machining a sheet-shaped workpiece by applying a pressure to a principal surface of the workpiece is to be placed; a second plate-shaped member (24) including one second principal surface (24*a*) and the other second principal surface (24*b*), the second plate-shaped member being arranged such that the one second principal surface faces the other first principal surface with the machining member interposed therebetween; a first pressure member (20) for applying a first pressure directed from the one first principal surface side toward the other first principal surface side to a portion of the one first principal surface; a second pressure member (22) for applying a second pressure directed from the other second principal surface side toward the one second principal surface side to a portion of the other second principal surface; a first changing unit (44) for changing a portion that the first pressure member pressurizes; and a second changing unit (56) for changing a portion that the second pressure member pressurizes such that the portion that the second pressure member pressurizes is aligned with the portion that the first pressure member pressurizes when viewed from a direction crossing the other second principal surface.

Supplementary Note 2

The workpiece machining apparatus according to (Supplementary Note 1), wherein the first changing unit is a unit for moving the first pressure member along the one first principal surface, and the second changing unit is a unit for moving the second pressure member along the other second principal surface.

Supplementary Note 3

The workpiece machining apparatus according to (Supplementary Note 1) or (Supplementary Note 2), wherein at least in a step of changing the portion that the first pressure member pressurizes by the first changing unit, a position of the first plate-shaped member at least in a direction along the one first principal surface is fixed, and at least in a step of changing the portion that the second pressure member pressurizes by the second changing unit, a position of the second plate-shaped member at least in a direction along the one second principal surface is fixed.

Supplementary Note 4

The workpiece machining apparatus according to any one of (Supplementary Note 1) to (Supplementary Note 3), wherein the first pressure member includes a roller (20)

configured to roll on the one first principal surface, and an amount of rotation of the roller from a step of feeding the workpiece to a step of discharging the workpiece is greater than an amount of rotation corresponding to the length of the outer periphery of the roller.

Supplementary Note 5

The workpiece machining apparatus according to any one of (Supplementary Note 1) to (Supplementary Note 4), further including a detection unit (70) configured to detect a position of the workpiece fed between the one second principal surface and the machining member, wherein, on the basis of a result of detection by the detection unit, the first changing unit starts to change the portion that the first pressure member pressurizes.

Supplementary Note 6

The workpiece machining apparatus according to any one of (Supplementary Note 1) to (Supplementary Note 5), further including a conveying unit (60) configured to convey the workpiece fed between the one second principal surface and the machining member by a predetermined distance, wherein, every time the first changing unit coveys the workpiece by the predetermined distance, the first changing unit changes a direction toward which the pressurized portion is changed.

Supplementary Note 7

The workpiece machining apparatus according to (Supplementary Note 6), wherein the conveying unit is configured to convey the workpiece in a predetermined direction, and the predetermined distance is fixed regardless of the length of the machining member in the predetermined direction.

LIST OF REFERENCE NUMERALS

10: Workpiece machining apparatus
12: Pressure plate
12*a*: Upper surface
12*b*: Lower surface
14: Protective plate
16: Blade die unit
16*a*: Blade die
161*a*: Support member
162*a*: Cutting blade
163*a*: Elastic body
16*b*: Blade die frame
18: Base plate
18*a*: Upper surface
18*b*: Lower surface
20: Upper pressure roller
22: Lower pressure roller
24: Face plate
24*a*: Upper surface
24*b*: Lower surface
26: Pedestal
28: Base plate cover
30: Workpiece discharge roller
32: Blade die unit stay
34: Blade die unit lifting/lowering motor
36: Cam shaft
38: Blade die unit lifting/lowering cam
40: Cam position detection sensor
42: Main body frame
44: Roller unit moving motor
44*s*: Motor shaft
46: Guide roller
48: Guide rail
50: Sensor unit
52: Sensor dog
54: Pressure roller bearing
55: Pressure adjustment handle
56: Pressure roller support pole
56*m*: Support pole main body
56*s*: Spring
57: Handle fixing knob
58: Roller unit moving belt
59: Pressure roller frame
60: Workpiece conveying mechanism
62: Workpiece conveying frame
64*a*: Upper conveyor belt
64*b*: Lower conveyor belt
66*a*: Upper conveyor belt pulley
66*b*: Lower conveyor belt pulley
68: Workpiece conveying motor
70: Workpiece detection sensor
72: Discharge detection sensor
74: Workpiece conveying mechanism stay
76: Conveyor belt retainer
78: Workpiece receiver
RU: Roller unit

The invention claimed is:

1. A workpiece machining apparatus comprising:

a first plate-shaped member including one first principal surface and the other first principal surface on which a machining member for machining a sheet-shaped workpiece by applying a pressure to a principal surface of the workpiece is to be placed;

a second plate-shaped member including one second principal surface and the other second principal surface, the second plate-shaped member being flexible and being arranged such that the one second principal surface faces the other first principal surface with the machining member interposed therebetween;

a first pressure member for applying a first pressure directed from the one first principal surface side toward the other first principal surface side to a portion of the one first principal surface;

a second pressure member for applying a second pressure directed from the other second principal surface side toward the one second principal surface side to a portion of the other second principal surface;

a first changing unit for changing a portion that the first pressure member pressurizes;

a second changing unit for changing a portion that the second pressure member pressurizes such that the portion that the second pressure member pressurizes is aligned with the portion that the first pressure member pressurizes when viewed from a direction crossing the other second principal surface; and a detection unit configured to detect a position of the workpiece fed between the one second principal surface and the machining member, wherein, on the basis of a result of detection by the detection unit, the first changing unit starts to change the portion that the first pressure member pressurizes.

2. The workpiece machining apparatus according to claim 1, wherein the first changing unit comprises a motor for moving the first pressure member along the one first principal surface, and the second changing unit is a unit configured to support the first pressure member and the second pressure member.

3. The workpiece machining apparatus according to claim 2, wherein at least in a step of changing the portion that the first pressure member pressurizes by the first changing unit, a position of the first plate-shaped member at least in a direction along the one first principal surface is fixed, and at least in a step of changing the portion that the second pressure member pressurizes by the second changing unit, a position of the second plate-shaped member at least in a direction along the one second principal surface is fixed.

4. The workpiece machining apparatus according to claim 2, wherein the first pressure member includes a roller configured to roll on the one first principal surface, and an amount of rotation of the roller from a step of feeding the workpiece to a step of discharging the workpiece is greater than an amount of rotation corresponding to the length of the outer periphery of the roller.

5. The workpiece machining apparatus according to claim 2, further comprising a conveying unit configured to convey the workpiece fed between the one second principal surface and the machining member by a predetermined distance, wherein, every time the first changing unit coveys the workpiece by the predetermined distance, the first changing unit changes a direction toward which the pressurized portion is changed.

6. The workpiece machining apparatus according to claim 5, wherein the conveying unit is configured to convey the workpiece in a predetermined direction, and the predetermined distance is fixed regardless of the length of the machining member in the predetermined direction.

7. The workpiece machining apparatus according to claim 1, wherein at least in a step of changing the portion that the first pressure member pressurizes by the first changing unit, a position of the first plate-shaped member at least in a direction along the one first principal surface is fixed, and at least in a step of changing the portion that the second pressure member pressurizes by the second changing unit, a position of the second plate-shaped member at least in a direction along the one second principal surface is fixed.

8. The workpiece machining apparatus according to claim 7, wherein the first pressure member includes a roller configured to roll on the one first principal surface, and an amount of rotation of the roller from a step of feeding the workpiece to a step of discharging the workpiece is greater than an amount of rotation corresponding to the length of the outer periphery of the roller.

9. The workpiece machining apparatus according to claim 7, further comprising a conveying unit configured to convey the workpiece fed between the one second principal surface and the machining member by a predetermined distance, wherein, every time the first changing unit coveys the workpiece by the predetermined distance, the first changing unit changes a direction toward which the pressurized portion is changed.

10. The workpiece machining apparatus according to claim 9, wherein the conveying unit is configured to convey the workpiece in a predetermined direction, and the predetermined distance is fixed regardless of the length of the machining member in the predetermined direction.

11. The workpiece machining apparatus according to claim 1, wherein the first pressure member includes a roller configured to roll on the one first principal surface, and an amount of rotation of the roller from a step of feeding the workpiece to a step of discharging the workpiece is greater than an amount of rotation corresponding to the length of the outer periphery of the roller.

12. The workpiece machining apparatus according to claim 11, further comprising a conveying unit configured to convey the workpiece ted between the one second principal surface and the machining member by a predetermined distance, wherein, every tine the first changing unit coveys the workpiece by the predetermined distance, the first changing unit changes a direction toward which the pressurized portion is changed.

13. The workpiece machining apparatus according to claim 12, wherein the conveying unit is configured to convey the workpiece in a predetermined direction, and the predetermined distance is fixed regardless of the length of the machining member in the predetermined direction.

14. The workpiece machining apparatus according to claim 1, further comprising a conveying unit configured to convey the workpiece fed between the one second principal surface and the machining member by a predetermined distance, wherein, every time the first changing unit conveys the workpiece by the predetermined distance, the first changing unit changes a direction toward which the pressurized portion is changed.

15. The workpiece machining apparatus according to claim 14, wherein the conveying unit is configured to convey the workpiece in a predetermined direction, and the predetermined distance is fixed regardless of the length of the machining member in the predetermined direction.

* * * * *